No. 819,255. PATENTED MAY 1, 1906.
R. L. STRINGFELLOW.
ANIMAL TRAP.
APPLICATION FILED FEB. 15, 1906.
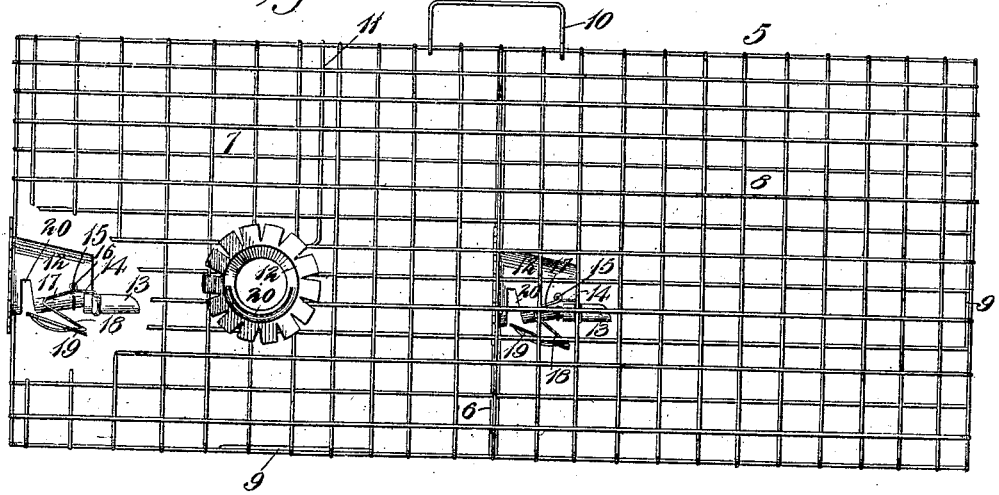
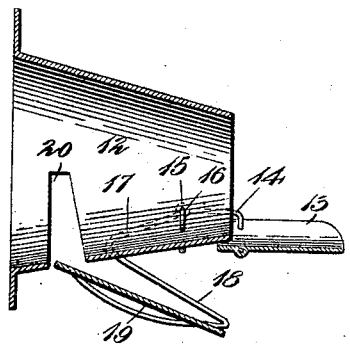
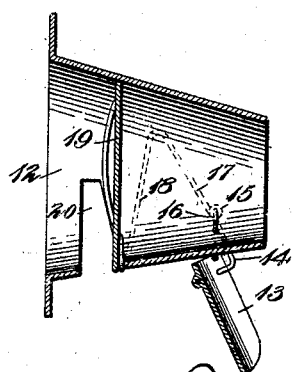
Witnesses
W. H. Ouvand
M. A. Schmidt
Inventor
Robert L. Stringfellow,
By Milo B. Stevens and Co.
Attorneys.

UNITED STATES PATENT OFFICE.

ROBERT LEE STRINGFELLOW, OF WHITE BLUFFS, TENNESSEE.

ANIMAL-TRAP.

No. 819,255.  Specification of Letters Patent.  Patented May 1, 1906.

Application filed February 15, 1906. Serial No. 301,195.

*To all whom it may concern:*

Be it known that I, ROBERT LEE STRINGFELLOW, a citizen of the United States, residing at White Bluffs, in the county of Dickson and State of Tennessee, have invented new and useful Improvements in Animal-Traps, of which the following is a specification.

This invention relates to animal-traps, and more particularly the entrance of a cage-trap. The object of the invention is to provide an entrance having a guard to prevent the escape of the animal, said guard being operated by the animal.

In the accompanying drawings, Figure 1 is an elevation of the trap. Fig. 2 is a longitudinal section through the entrance; and Fig. 3 is a view similar to Fig. 2, showing the parts in another position.

Referring specifically to the drawings, 5 denotes a cage, which is made of any suitable material, but preferably of wire, as shown. The cage contains a partition 6, which divides it into two compartments 7 and 8, respectively, each of which has a door 9 for the removal of the trapped animal. The cage is also provided with a bail 10, and inside the compartment 7 is a bait-hook 11. The entrance to the cage is through a tube 12, which extends into the cage and is open at both ends. This tube is funnel-shaped, the smaller end being on the inside of the cage. At the inner or exit end of the tube is a tilting platform 13, which is pivoted to the tube by arms 14, extending from the platform and bent to form loops 15, into which extend pivot-pins 16, projecting from the outside of the tube. The arms may be formed of wire, as shown, and they are extended beyond the loop, as at 17, and then bent outwardly, as at 18, at the end of which the arms carry a guard-plate 19, adapted to enter the tube from the bottom thereof through a slit 20 therein when the platform is tilted by the weight of the animal stepping thereon. The plate is of such size that when it is inside the tube it completely closes the same behind the animal.

In operation the animal being attracted by the bait enters the tube, and upon stepping on the platform 13 it is tilted. If the animal is not precipitated into the cage, he will become frightened by the guard-plate 19 rising up behind him and he will spring into the trap rather than turn around and leave the tube through its front end.

In the cage illustrated in the drawings the compartment 7 has an entrance-tube in the end and one in each side. The partition 6 also has an entrance-tube to enable the animals to enter the compartment 8. Escape from the cage is impossible, because the outlet of the tube is too small for the animal to jump thereinto, and if he steps on the platform the guard-plate will rise up, as before stated, and frighten him back into the cage.

I claim—

1. In a trap, the combination with a cage, of an entrance-tube extending thereinto, and having at its exit end a tilting platform carrying a guard-plate extending into the tube behind the platform, when the latter is tilted.

2. In a trap, the combination with a cage, of an entrance-tube extending thereinto, and having at its exit end a tilting platform, and behind said platform a slit, and a guard-plate carried by the platform, and swinging through the aforesaid slit into the tube to close the latter when the platform is tilted.

In testimony whereof I have signed my name to this specification in the presence of two subscribing witnesses.

ROBERT LEE STRINGFELLOW.

Witnesses:
 JOSIAH G. BROWN,
 ROE HOWELL.